Patented June 30, 1942

UNITED STATES PATENT OFFICE 2,287,836

PARASITICIDE

Frank B. Smith and John N. Hansen, Midland, Mich., assignors to The Dow Chemical Company, Midland, Mich., a corporation of Michigan No Drawing. Application May 31, 1940,
Serial No. 338,043

20 Claims. (Cl. 167—31)

This invention relates to parasiticides and particularly to insecticide and fungicide compositions in which amino-acid ester salts of phenols are employed as toxic ingredients.

Many synthetic organic compounds have been suggested as substitutes for lead arsenate and for copper-containing inorganic compounds as employed in insecticide and fungicide compositions. These synthetic toxicants may be injurious to plant foliage unless the concentration in which they are used is carefully controlled. A further disadvantage accruing to many of the synthetic toxicants heretofore employed is their toxicity to humans and incompatibility with other insecticidal materials. Many of the phenols heretofore suggested have not been entirely satisfactory, due to their solubility in water and high volatility, whereby they are readily leached or vaporized away from plant surfaces. Furthermore, such compounds are frequently corrosive to the skin of humans and produce aqueous solutions which burn foliage or adversely affect normal plant metabolism.

Many phenols, and particularly those containing one or more nitro groups substituted in the benzene nucleus, have been suggested as fungicidal and insecticidal toxicants, and when properly compounded are highly efficient for the control of selected fungi and insects. A number of these compounds and their salts form aqueous solutions which have a corrosive action on growing leaves. This characteristic of solubility is further disadvantageous in that solid residues are washed away from tree surfaces by rain and dew. An additional disadvantage is that many of these compounds are relatively impermanent in their action against fungi and insects, due to their high volatility and tendency to oxidize or otherwise disintegrate upon contact with the air.

We have discovered that the addition salts of the amino-acid esters with phenols are effective fungicidal and insecticidal toxicants, and that compositions comprising the less water-soluble of these products may be applied to growing foliage without causing injury to the extent previously inherent in the use of the free phenols and their more soluble salts.

The compounds with which the present invention is broadly concerned are the amino-acid ester salts of phenols. These compounds are for the most part crystalline solids, stable to light and air and not appreciably affected by carbon dioxide. The compounds may be prepared by reacting an amino-acid ester such as glycine ethyl ester with a phenol to form the addition salt. The reaction may be carried out conveniently by contacting benzene solutions of equimolecular proportions of the phenol and amino-acid ester, although any suitable amounts of the reactants may be employed. Reduced amounts of the solvent are required if the reaction is carried out at temperatures between about 40° and 120° C. as, for example, at the refluxing temperature of the reaction mixture. On addition of an amino-acid ester solution to a solution of the phenol the insoluble addition salt of the phenol begins to separate or precipitate out of the mixture. The reaction is generally complete within one hour after the reactants are combined. The reaction mixture can then be cooled and filtered to separate out the desired phenolate product which may be further purified by washing with a small amount of such solvents as benzene, chloro-benzene, and the like. The phenolate derivative is dried to remove residual solvent prior to use.

A convenient method of operation whereby the amino-acid ester solution is readily obtained, comprises dissolving an amino-acid hydrochloride and a suitable hydroxyl-containing organic compound, such as an alcohol or phenol, in benzene and thereafter heating the mixture to its refluxing temperature while passing gaseous hydrogen chloride therethrough. This results in the formation of the amino-acid ester hydrochloride. The mixture may then be blown with ammonia gas to liberate the amino-acid ester. Ammonium chloride which is formed in the reaction is filtered off and excess ammonia removed by blowing the filtrate with air. The resulting benzene solution of the free amino-acid ester is adapted to be employed in the preparation of addition salts of phenols as herein set forth. When, as is frequently the case, a molecular excess of the alcohol or phenol is used in preparing the ester, the unreacted portions thereof may be separated from the mixture by fractionally distilling the mixture to remove both solvent and excesses of the hydroxy compound and to leave a residue of the amino-acid ester hydrochloride.

While this invention is concerned with parasiticidal compositions comprising the amino-acid ester salts of phenols generally, it is particularly directed to the reaction product obtained by the addition of amino-acid esters to certain mononitro and dinitro monohydric phenols. The compounds of this class which have been found particularly valuable as insecticidal and fungicidal toxicants are those having the formula:

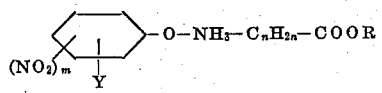

wherein $n$ is an integer, $m$ is an integer not greater than 2, R represents a hydrocarbon radical, and Y represents a radical selected from the group consisting of aryl, alkyl, cycloalkyl, aralkyl, chlorine, bromine, arylamino, and hydrogen.

These compounds are difficultly soluble, high melting crystalline solids which are yellow to orange-red in color.

Of this group of derivatives a further line of distinction is appreciated as to the existence of a subgeneric group of compounds which have an extremely low solubility in water. These compounds have the following formula:

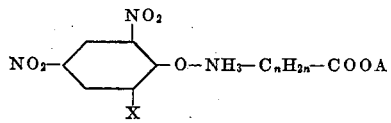

wherein $n$ is an integer, A represents a non-benzenoid hydrocarbon radical such as alkyl or cycloalkyl and X is a saturated hydrocarbon radical containing at least two carbon atoms. Compounds falling within this formula have been found to have a solubility in water generally below 0.25 gram per 100 milliliters at 25° C. This low solubility, coupled with the high melting point, stability, and low vapor pressure, results in an extended residual toxicity against insect pests and reduced foliage injury for compositions comprising these salts as toxic ingredients. This is of importance in spray compositions comprising the compounds, but is also of concern in the maintenance of toxic residues on tree surfaces which may be contacted by rain or dew. A further advantage in the use of these salts lies in the fact that their properties of solubility and stability permit their use in combination with common organic and inorganic insecticidal toxicants which heretofore have been considered incompatible with phenols and their salts.

Of the amino-acid esters which are employed in the preparation of those compounds with which the present invention is concerned, a preferred group has the general formula:

$$H_2N-C_nH_{2n}-COOR$$

wherein $n$ is an integer and R represents a hydrocarbon radical. These amino-acid ester compounds are readily available and relatively cheap to manufacture, and produce addition salts with phenols which have desirable insecticidal properties.

The physical characteristics of representative amino-acid ester salts of phenols are set forth in the following table:

ethyl ester, isoleucine ethyl ester, tyrosine amyl ester, tyrosine ethyl ester, tyrosine octyl ester, tyrosine palmityl ester, tyrosine glyceryl ester, glycine propyl ester, glycine isopropyl ester, glycine isobutyl ester, glycine-n-butyl ester, glycine amyl ester, glycine isoamyl ester, glycine benzyl ester, glycine xenyl ester, glycine phenyl ester, and the like with phenol, 4-chloro-phenol, 2.5-dichloro phenol, 2.4.6-trichloro phenol, 2-phenyl phenol, 3-cyclohexyl phenol, alpha naphthol, dinitro-alpha naphthol, 4-benzyl phenol, 2.4-dinitro-5-cyclohexyl phenol, 2.4-dinitro-octadecyl phenol, 2.4.6-trinitro-5-cyclohexyl phenol, 2.4-dinitro-6-benzyl phenol, 2.5-dinitro-4-cyclohexy phenol, 2-brom-4.6-dinitro phenol, 2.4-dinitro-5-naphthyl-amino phenol, 2.4-dinitro-5-anilino phenol, 4-tertiary-octyl phenol, 2-methyl-4-tertiary-butyl phenol, guaiacol, thymol, carvacrol, and the like.

The compounds set forth above may be employed generally as toxicants in parasiticidal compositions. They may be used as constituents of either dusting or spraying compositions. In such use they may be compounded with various inert carriers, such as diatomaceous earth, bentonite, talc, sulphur, wood flours, inorganic phosphates, or the like, to form dusts adapted to be applied with standard dusting equipment. If desired, such dusts may be employed as concentrates and subsequently diluted with additional inert carrier, or suspended in water or other liquid carrier to form sprays. The amino-acid ester addition salts may also be incorporated with various wetting, dispersing, and sticking agents and subsequently diluted to produce spray compositions in which the phenolate is present in any desired concentration.

In the preparation of concentrates, from about 5 to about 80 per cent of the amino-acid ester salt is commonly employed. The concentration of the amine salt in spray or dust compositions on application to leaf foliage is preferably between about 0.01 per cent and 5.0 per cent by weight. The composition type in which the salt is employed and the concentration thereof in the final composition, are dependent upon the particular insect or fungi to be controlled and the circumstances under which such control is to be accomplished.

In other embodiments of the invention the amino-acid ester salts may be employed in com-

TABLE

| Compound | Melting point | Solubility in grams per 100 grams of water at 25° C. | pH of saturated solution | Color |
|---|---|---|---|---|
| | °C. | | | |
| Glycine ethyl ester salt of pentachloro phenol | 163–4 | 0.098 | | White. |
| Glycine cyclohexyl ester salt of 2-cyclohexyl-4.6-dinitro phenol | 153 | 0.0076 | 6.3 | Yellow. |
| Glycine n-hexyl ester salt of 2-cyclohexyl-4.6-dinitro phenol | 120–1 | 0.0083 | 6.33 | Do. |
| Glycine ethyl ester salt of 2-cyclohexyl-4.6-dinitro phenol | 145–6 | 0.0408 | 6.9 | Do. |
| Glycine ethyl ester salt of 2-chloro-4.6-dinitro phenol | 160–1 | 0.575 | 3.85 | Do. |
| Glycine ethyl ester salt of 2-chloro-4-nitro phenol | 103–5 | 4.07 | 6.2 | Do. |
| Glycine ethyl ester salt of 2-methyl-4.6-dinitro phenol | 140 | 0.696 | 5.9 | Do. |
| Glycine ethyl ester salt of 2-n-hexyl-4.6-dinitro phenol | 103–4.5 | 0.124 | 7.0 | Do. |
| Glycine ethyl ester salt of 2.4-dinitro phenol | 131–2 | 2.85 | 5.9 | Do. |
| Glycine ethyl ester salt of 2-phenyl-4.6-dinitro phenol | 151–3 | 0.12 | 6.9 | Do. |
| Glycine cyclohexyl ester salt of 2-chloro-4.6-dinitro phenol | 203 | 0.103 | 6.0 | Do. |
| Glycine n-hexyl ester salt of 2.4-dinitro phenol | 86–7 | 0.285 | 5.25 | Do. |
| Glycine n-hexyl ester salt of 2-phenyl-4.6-dinitro phenol | 131–2 | 0.0167 | 6.4 | Do. |

Other amino-acid ester salts of phenol which may be employed as parasiticidal toxicants as herein disclosed include the addition compounds obtained by reacting such amino-acid esters as alanine methyl ester, alanine ethyl ester, leucine bination with oil emulsions. They may also be employed in water suspension with or without an additional emulsifying, wetting, or dispersing agent. Where it is desired to impregnate solid carriers with the amino-acid ester salts, the carrier may be introduced into the salt reaction mixture and the phenolate precipitated directly in and on the carrier surfaces. An alternative procedure consists of first wetting the carrier with one of the reactants dissolved in a suitable organic solvent, and thereafter contacting the mixture with a solution of the second reactant to produce the desired compound in situ. The amino-acid ester salt may similarly be incorporated in other standard type insecticidal compositions either as the sole toxic ingredient of such composition, or in combination with such materials as inorganic pigments, organic dyes, lead arsenate, pyrethrum, rotenone, cryolite, zinc sulphide, organic thiocyanates, sulphur, copper sprays and related compounds.

The several examples are illustrative with respect to the particular compounds, composition types and concentrations employed, but are not to be construed as limiting the invention.

Example 1

20 parts by weight of the glycine ethyl ester salt of 2-cyclohexyl-4.6-dinitro phenol and 80 parts of diatomaceous earth were mixed together and ground in a ball mill to an average particle size of less than 5 microns diameter. One pound of this composition was dispersed in 100 gallons of water to form a spray mixture comprising 0.2 pound of the active toxicant. This spray was applied to potato foliage infested with Colorado potato beetle larvae and killed 89 per cent of the organism in two days. The potato foliage showed no injury from the treatment. In a comparative test, lead arsenate at a concentration of three pounds per 100 gallons was applied and found to kill 87 per cent of the potato beetle larvae in two days.

Example 2

In a similar manner 1.5 pounds of the composition described in Example 1 was dispersed in 100 gallons of water to obtain a spray composition comprising 0.3 pound of the glycine ethyl ester salt of 2-cyclohexyl-4.6-dinitro phenol. This composition was applied to apple foliage infested with fifth instar walnut worms, and found to give 100 per cent control of the larvae. A concentration of three pounds per 100 gallons of lead arsenate also gave a control of 100 per cent.

Example 3

20 parts by weight of the glycine cyclohexyl ester salt of 2-cyclohexyl-4.6-dinitro phenol was mixed with 80 parts diatomaceous earth substantially as described in the foregoing example and applied in a toxicant concentration of three pounds per 100 gallons for the control of Colorado potato beetle. This composition was 94 per cent and 100 per cent effective in one and two days, respectively. Lead arsenate at three pounds per 100 gallons concentration gave a control of 78 per cent in one day and 87 per cent in two days.

Example 4

The composition disclosed in Example 1 was tested to determine its effect upon the young foliage of the soya bean. At 0.2 pound of the glycine ethyl ester salt of 2-cyclohexyl-4.6-dinitro phenol per 100 gallons no injury of the bean leaves was observed. At concentrations of 0.4 and 0.6-pound per 100 gallons, a slight injury, characterized by the fading and yellowing of between 5 and 10 per cent of the leaves was observed. In a comparative test, acid lead arsenate at three pounds per 100 gallons concentration produced severe injury on 20 per cent of the soya leaves.

Example 5

Dusting compositions comprising the amino acid ester salts of phenol as toxic ingredients are illustrated by the following:

Composition 1

| | Parts by weight |
|---|---|
| Glycine n-hexyl ester salt of 2-cyclohexyl-4.6-dinitro phenol | 1 |
| Sulphur | 99 |

Composition 2

| | Parts by weight |
|---|---|
| Glycine ethyl ester salt of 2-methyl-4.6-dinitro phenol | 2 |
| Walnut shell flour | 98 |

Composition 3

| | Parts by weight |
|---|---|
| Glycine ethyl ester salt of 2-n-hexyl-4.6-dinitro phenol | 1.5 |
| Diatomaceous earth | 98.5 |

Composition 4

| | Parts by weight |
|---|---|
| Glycine cyclohexyl ester salt of 2.4-dinitro phenol | 3 |
| Sulphur | 12 |
| Diatomaceous earth | 85 |

The above and related compositions may be applied with standard dusting equipment for the control of codling moth, red spider thrips, and other parasites.

Example 6

Concentrates useful for the preparation of insecticidal and fungicidal sprays are as follows:

Composition 5

| | Parts by weight |
|---|---|
| Tyrosine glyceryl ester salt of 2-methyl-4.6-dinitro phenol | 80 |
| Sodium salt of sulphonated lauryl alcohol | 20 |

Composition 6

| | Parts by weight |
|---|---|
| Glycine cyclohexyl ester salt of 2.4-dinitro phenol | 75 |
| Partially neutralized sulphonated sperm oil | 25 |

The above mixtures may be dispersed in water in amounts of from 0.25 pound to 5.0 pounds per 100 gallons to form aqueous suspensions suitable for application to the trunks and branches of trees during the dormant period. Such aqueous compositions are also of value for spraying the ground adjacent to trees or shrubs. When applied in this manner, the amino-acid ester salt of the phenol serves as an active toxicant not only against insect pests, but also aids in the control of various spore forming fungi.

Example 7

The following are representative of compositions adapted to be employed as fungicide concentrates and having insecticidal activity as well:

Composition 7

| | Parts by weight |
|---|---|
| Glycine ethyl ester salt of pentachloro phenol | 10 |
| Pine oil | 40 |
| Sodium salt of sulphonated castor oil | 50 |

Composition 8

| | Parts by weight |
|---|---|
| Leucine ethyl ester salt of 2.4.5-trichloro phenol | 5 |
| Bentonite | 90 |
| Sodium salt of sulphonated lauryl alcohol | 5 |

The foregoing compositions may be diluted with water to obtain dispersions adapted to be applied for the disinfection of stables, chicken yards, and the like.

EXAMPLE 8

A further application to which the amino-acid ester salts of phenols may be directed consists of their incorporation in various leather treating compositions. For example, the following fungicidal pickling solutions may be prepared:

Composition 9

| | Pounds |
|---|---|
| Water | 100 |
| Sodium chloride | 12 |
| Sulphuric acid | 1.5 |
| Glycine ethyl ester salt of 2-chloro-4-nitro phenol | 0.2 |

Composition 10

| | Pounds |
|---|---|
| Water | 50 |
| Sodium chloride | 6 |
| Sulphuric acid | 0.5 |
| Alanine ethyl ester salt of 2.4.5.6-tetrachloro phenol | 0.2 |

When skins and hides are immersed and soaked in the foregoing compositions the development of undesirable fungi and bacteria both on the leather and in the treating solution is substantially inhibited.

The amino-acid ester salts of the phenols described above are relatively non-toxic to humans as compared with many inorganic insecticides and fungicides containing lead, arsenic, mercury, cyanide, fluorine, copper, etc., at present used for parasite control. They are substantially non-explosive and difficultly flammable. Numerous instances in which they have been contacted with the skins of humans indicates that they are relatively non-corrosive and not inclined to produce dermatitis even on repeated application.

A copending application, Serial No. 338,044 filed concurrently herewith sets forth the preparation and physical characteristics of a large number of the amino-acid ester salts of phenols and claims these addition salts as new compounds.

Other modes of applying the principle of our invention may be employed instead of those explained, change being made as regards the materials and amounts concerned provided the ingredients stated by any of the following claims or their equivalent be employed.

We therefore particularly point out and distinctly claim as our invention:

1. A parasiticidal composition comprising as a toxic ingredient an amino-acid ester salt of a phenol.
2. An insecticidal composition comprising as a toxic ingredient a mono-amino mono-carboxylic acid ester salt of a phenol in intimate mixture with a finely divided solid carrier.
3. A parasiticidal spray comprising an aqueous dispersion of a finely divided mono-amino mono-carboxylic acid ester salt of a phenol.
4. A parasiticidal composition comprising as a toxic ingredient a mono-amino mono-carboxylic acid ester salt of a monohydric phenol.
5. A parasiticidal composition comprising as a toxic ingredient a mono-amino mono-carboxylic acid ester salt of a nitrated monohydric phenol.
6. A parasiticidal composition comprising as a toxic ingredient a mono-amino mono-carboxylic acid ester salt of a nitrated monohydric phenol in which not more than two nitro radicals are directly attached to the oxygenated benzene nucleus.
7. A parasiticidal composition comprising as a toxic ingredient a mono-amino mono-carboxylic acid ester salt of a nitrated monohydric phenol characterized by nuclearly substituted nitro groups in the para position and in one of the positions ortho to the phenolic hydroxyl radical.
8. A parasiticidal composition comprising as a toxic ingredient a glycerine ester salt of a nitrated monohydric phenol.
9. A parasiticidal composition comprising as a toxic ingredient a compound having the formula:

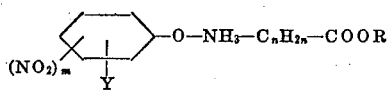

wherein $n$ is an integer, $m$ is an integer not greater than 2, R represents a hydrocarbon radical, and Y represents a radical selected from the group consisting of aryl, alkyl, cycloalkyl, aralkyl, chlorine, bromine, arylamino, and hydrogen.

10. An insecticidal composition comprising as a toxic ingredient a compound having the formula:

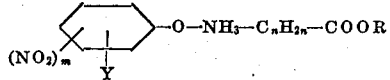

wherein $n$ is an integer, $m$ is an integer not greater than 2, R represents a hydrocarbon radical, and Y represents a radical selected from the group consisting of aryl, alkyl, cycloalkyl, aralkyl, chlorine, bromine, arylamino, and hydrogen in intimate mixture with a finely divided solid carrier.

11. A parasiticidal spray comprising an aqueous dispersion of a compound having the formula:

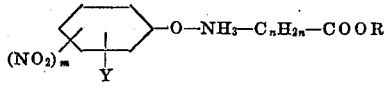

wherein $n$ is an integer, $m$ is an integer not greater than 2, R represents a hydrocarbon radical, and Y represents a radical selected from the group consisting of aryl, alkyl, cycloalkyl, chlorine, bromine, arylamino, aralkyl, and hydrogen.

12. A parasiticidal composition comprising as a toxic ingredient a compound having the formula:

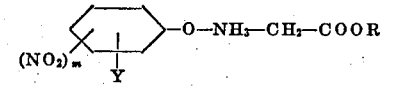

wherein $m$ is an integer not greater than 2, R represents a hydrocarbon radical and Y represents a radical selected from the group consisting of aryl, alkyl, cycloalkyl, aralkyl, chlorine, bromine, arylamino, and hydrogen.

13. A parasiticidal composition comprising as a toxic ingredient a compound having the formula:

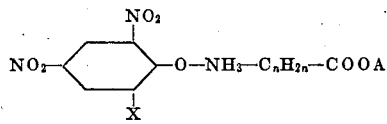

wherein $n$ is an integer, A represents a nonbenzenoid hydrocarbon radical, and X is a saturated hydrocarbon radical containing at least two carbon atoms.

14. A parasiticidal composition comprising as a toxic ingredient a compound having the formula:

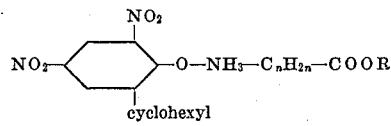

wherein $n$ is an integer, and R represents a hydrocarbon radical.

15. A parasiticidal composition comprising as a toxic ingredient a compound having the formula:

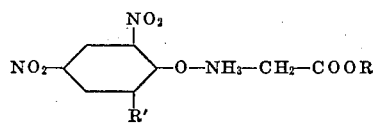

wherein R represents a hydrocarbon radical, and R' represents a saturated hydrocarbon radical containing six carbon atoms.

16. A parasiticidal composition comprising as a toxic ingredient a compound having the formula:

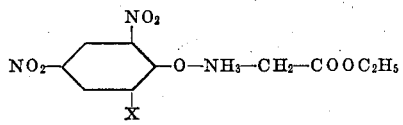

wherein X represents a saturated hydrocarbon radical containing at least two carbon atoms.

17. A parasiticidal composition comprising as a toxic ingredient the glycine ethyl ester salt of a nitrated monohydric phenol.

18. An insecticidal composition comprising as a toxic ingredient the glycine ethyl ester salt of a nitrated monohydric phenol in intimate mixture with a finely divided solid carrier.

19. An insecticidal composition comprising as a toxic ingredient the glycine ethyl ester salt of a nitrated monohydric phenol intimately mixed with diatomaceous earth.

20. A parasiticidal spray comprising an aqueous dispersion of a finely divided glycine ethyl ester salt of a nitrated monohydric phenol.

FRANK B. SMITH.
JOHN N. HANSEN.